June 23, 1964     F. TONNE     3,138,346
CONTROL DEVICE FOR CONVEYING PIPES FOR DISPATCH TUBES
Filed May 10, 1961     4 Sheets-Sheet 1

INVENTOR
Friedrich Tonne
BY

June 23, 1964   F. TONNE   3,138,346
CONTROL DEVICE FOR CONVEYING PIPES FOR DISPATCH TUBES
Filed May 10, 1961   4 Sheets-Sheet 2

INVENTOR

Friedrich Tonne

BY

June 23, 1964 F. TONNE 3,138,346
CONTROL DEVICE FOR CONVEYING PIPES FOR DISPATCH TUBES
Filed May 10, 1961 4 Sheets-Sheet 3

INVENTOR
Friedrich Tonne
BY

June 23, 1964  F. TONNE  3,138,346
CONTROL DEVICE FOR CONVEYING PIPES FOR DISPATCH TUBES
Filed May 10, 1961  4 Sheets-Sheet 4

INVENTOR

FRIEDRICH TONNE

BY

United States Patent Office 3,138,346
Patented June 23, 1964

3,138,346
CONTROL DEVICE FOR CONVEYING PIPES FOR DISPATCH TUBES
Friedrich Tonne, Robert-Haug-Weg 9, Stuttgart, Germany
Filed May 10, 1961, Ser. No. 109,094
Claims priority, application Germany May 11, 1960
20 Claims. (Cl. 243—16)

The present invention relates to a control device for use in connection with dispatch tube conveying pipes. Dispatch tubes which are guided in conveying pipes of circular cross section may turn in circumferential direction during their passage through the pipes whereby they change their radial position in a non-controllable manner. The electric contacts by means of which the control signals are initiated are, therefore, generally arranged circularly in said pipes or on the conveying tubes to make sure that the counter contacts serially arranged in the conveying pipe will be engaged in any radially changed position of the dispatch tube. However, by arranging such contact rings, valuable loading space in the dispatch tube is lost.

In an effort to remedy these defects, it has been suggested to arrange electric or magnetic contacts and control members so that they are radially adjustable in clockwise direction on the dispatch tube while control means have been provided by which the radial location of the dispatch pipe is automatically adjusted so that a contact between the contact members on the dispatch tube and in the conveying tube will be assured.

Furthermore, methods using magnetic goal markings have been developed according to which the impulses are received by field registering devices which are fixedly mounted on the conveying pipe, while these impulses are evaluated differently in conformity with the variable position of the dispatch tubes.

It is, therefore, an object of the present invention to provide a control device for use in connection with conveying pipes for dispatch tubes, which will overcome the above mentioned drawbacks.

It is another object of this invention to provide a control device of the above mentioned type, which will be highly reliable and simple in construction.

These and other objects and advantages of the invention will appear more clearly from the following specification in connection with the accompanying drawings, in which.

The control device according to the present invention is characterized primarily in that the conveying pipes are provided with electric contact strips or magnetic indicators in at least two spirals parallel to each other, said contact strips or magnetic indicators cooperating with at least two markings radially offset with regard to each other and arranged on the dispatch tubes.

Figure 1:
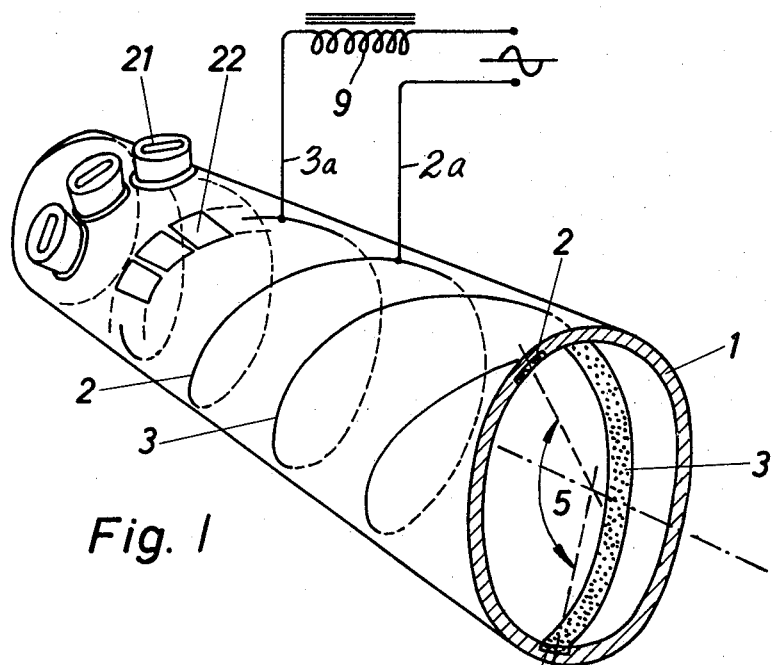
FIG. 1 is a perspective diagrammatic view of a conveying pipe section for use in connection with the arrangement according to the invention.

Referring now to the drawings in detail, FIG. 1 shows a conveying pipe of insulating material as for instance polyvinylchloride which comprises two spirals 2 and 3 of metallic contacting material which are inserted in the inner wall of pipe 1. The two spirals are evenly spaced from each other in axial direction. Consequently, the radial angle 5 taken in each cross sectional plane perpendicular to the axis 4 of pipe 1 will be of the same magnitude. If desired, also a metallic pipe may be employed into which is inserted an insulating layer forming the inner wall of the pipe and having arranged therein the metal spirals. The insulating layer with the metal spirals may also be designed as printed circuit.

Figure 2:
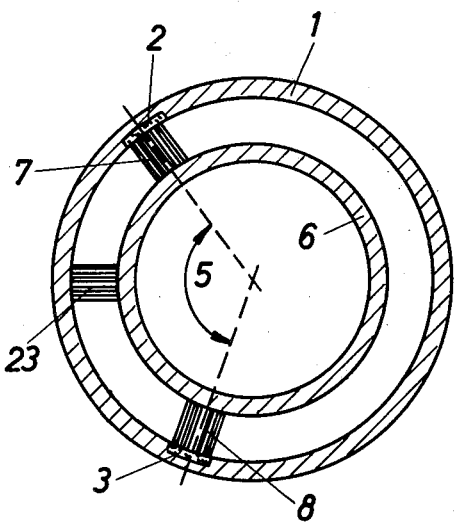
FIG. 2 is a radial section through the conveying pipe section of FIG. 1.

As will be evident from FIG. 2, the dispatch tube 6 has arranged thereon two radially adjustable electrically interconnected contact brushes 7 and 8 which are arranged at an angle 5 with regard to each other. In this way, at any random radial location of the dispatch tube 6 in the conveying pipe 1 an electrical connection will be established between the spirals 2 and 3 through the intervention of said contact brushes 7 and 8. The two spirals have connected thereto feeding lines 2a, 3a (FIG. 1) which may be fed by direct or by alternating current. One of said feeding lines has interposed therein an evaluating device 9, for instance a relay with time delay, a transformer, a transistor, or similar devices. In the arrangement shown in FIG. 1, the evaluating device consists of a relay 9 with delayed de-energization. When the two spirals are electrically interconnected by the contacts on the dispatch tube, the signal voltage at the terminals of the feeding lines 2a, 3a will produce a current which will be converted by the evaluating device into a corresponding signal.

Inasmuch as the angle 5 between the two contacts 7 and 8 (FIG. 2) is less than 180°, it will be evident that when said two contacts are engaged by the two spirals 2 and 3, two different evaluating possibilities will be obtained, in other words the shorter distance confined by said angle as well as the longer distance confined by the complementary angle may be employed for purposes of evaluation. In this instance, dispatch tubes are employed which between the contacts 2, 3 have different electrical circuit elements arranged depending on the desired goal marking. If, for instance, a diode is interposed in the line between said contacts so that these contacts are bridged by said diode, a current between said contacts is possible only for direct current in one direction. Depending on the poling of the signalling voltage on said two spirals, in this instance either an evaluating signal will be obtained, or the signal evaluation will not respond so that for a certain poling of the direct current-signal voltage no signal will be received.

Figure 7:
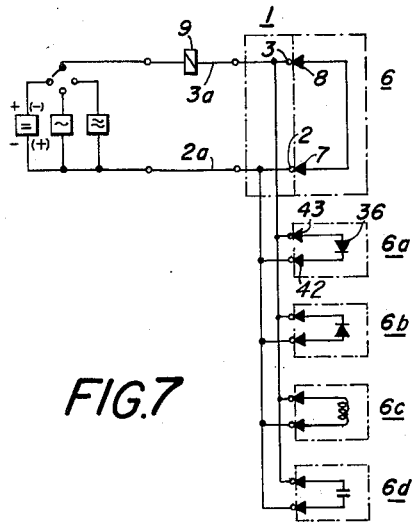
FIGS. 7–9 are circuit diagrams showing how different reference signals can be obtained.

When employing a signalling alternating voltage, the differentiation between the dispatch tubes may be effected by interposing impedances, the impedances being selected differently for different dispatch tubes. In this instance, signalling voltages of different frequencies will be applied to the spirals. If desired, also a signalling direct current voltage and a signalling alternating current voltage may be applied the different evaluation of which by the various dispatch tubes would be effected by bridging the contacts of certain dispatch tubes by condensers (FIG. 7).

Figure 3:
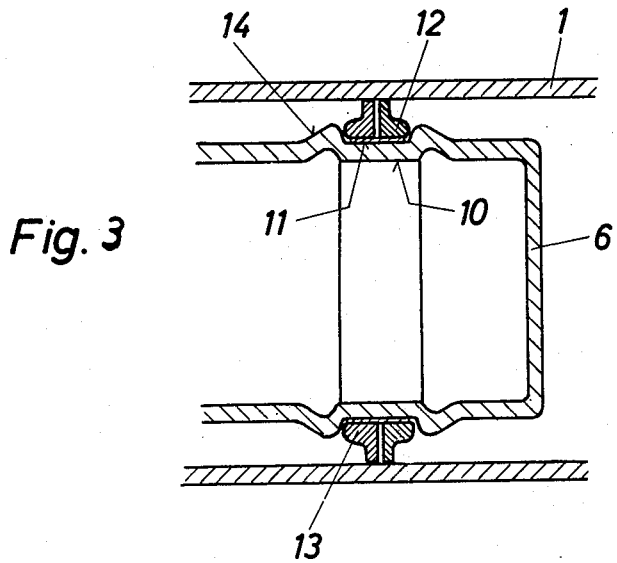
FIG. 3 represents an axial partial section through a conveying pipe according to FIG. 1 with a dispatch tube therein.

The radial adjustability of the contact brushes 7 and 8 may as indicated for instance in FIG. 3 be effected by inserting a metallic strip 11 in a groove 10 of a synthetic dispatch tube. Arranged on said metallic strip 11 is a two-part rubber ring 12, 13 which simultaneously serves as pneumatic sealing ring. The part 12 of the rubber ring is secured against rotation relative to the dispatch tube 6. The rubber ring part 12 contains at one point the contact brush 8 (not shown in FIG. 3) which at the foot of the rubber ring contacts the metallic strip 11 while said metallic strip 11 at the outer edge of the rubber ring engages the wall of the conveying pipe. The other part 13 of the rubber ring is rotatable in groove 10 and may be adjusted by providing the outer edge 14 of the dispatch tube with an outer marking, for instance a scale corresponding to the angle 5.

The contact brush may advantageously be so designed that a small tube of metal or other deformable material which has an annular shape partially surrounds the dispatch tube and is provided with openings from which contact wires protrude. One end of these wires is fixed for instance by compressing the small tube so that the wires extend freely through the openings. When the dispatch tube passes through the conveying pipe, the said wire brushes are slightly deformed and are able to carry out a torsion movement so that continuously a sufficient contact will be assured.

Figure 6:
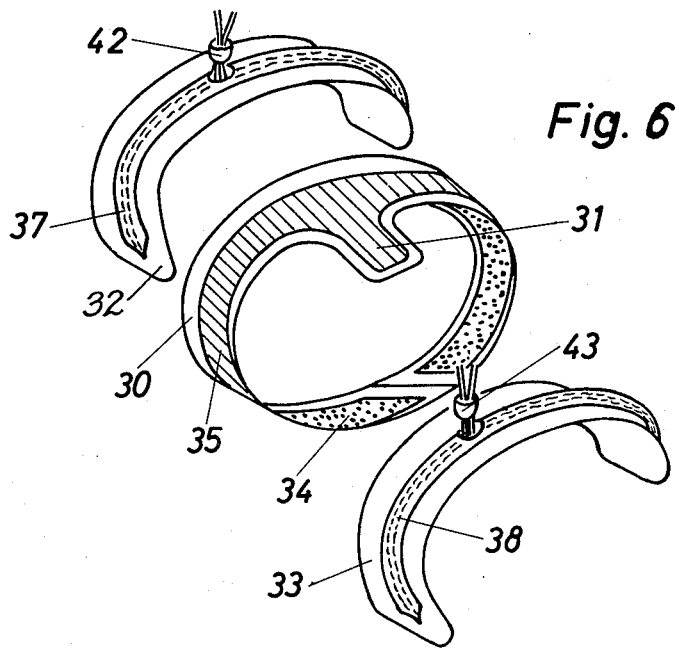
FIG. 6 is a perspective and exploded illustration of a contact ring.
Figure 5:
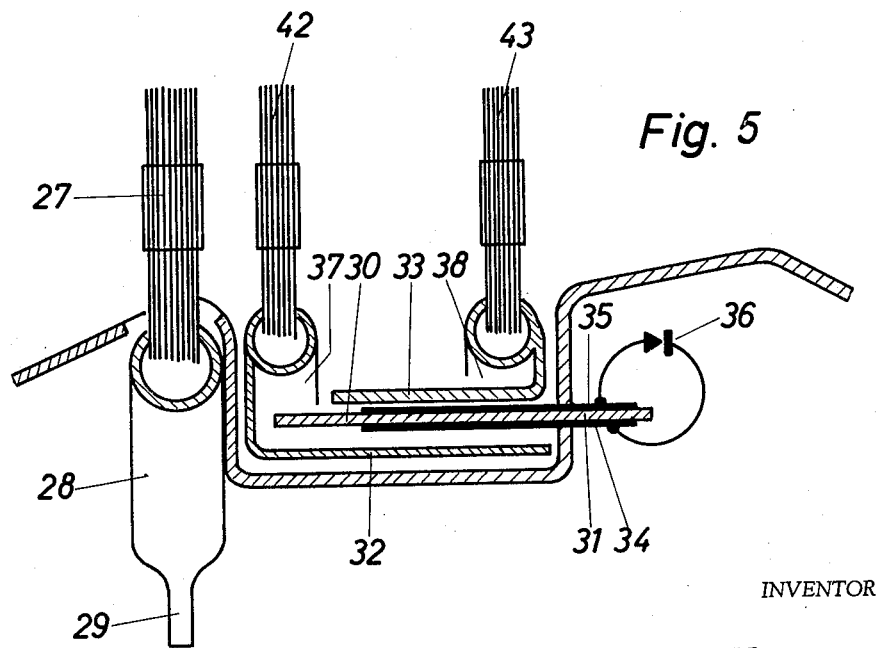
FIG. 5 illustrates a longitudinal section through a dispatch tube showing three different contacts, the section being shown on an enlarged scale.

FIGS. 5 and 6 illustrate a section and a perspective view respectively for indicating the arrangement of a plurality of contacts. As will be evident from FIG. 5, a non-displaceable contact 27 is arranged in a small tube 28 partially surrounding the dispatch tube and is held in its respective position for instance at point 29 formed by squeezing together the small tube 28. Inasmuch as the contact brush otherwise freely protrudes from the small tube 28, said contact brush will be subjected to torsion when the dispatch tube passes through the conveying pipe so that said contact brush will in each position of the dispatch tube resiliently engage the inner wall of the conveying pipe.

Mounted in an annular groove of the dispatch tube is a printed circuit 30 which is printed on both sides and has its nose 31 guided by the wall of the dispatch tube so that it is non-displaceably fixed. Below and above said printed circuit there are rotatably journalled resilient sheet metal rings 32 and 33 which are electrically connected to the contact brushes 42 and 43 respectively. By turning the rings 32, 33 or one of said rings, the distances between the brushes 42, 43 in radial direction may be varied so that they will be adjustable for conveying pipes with different arrangement of a plurality of spirals. Between the contact plates 34, 35 of the printed circuit 31 there is arranged for instance a diode 36 so that different evaluations will be possible as described above.

FIG. 6 shows the contact rings 32, 33, the small contact tubes 38, 37, and the printed circuit 31 in an exploded view. The small tube 37 with the contact spring 42 torsion-mounted therein is connected with the metal sheet ring 32 rotatably mounted on the dispatch tube. The arrangement of brush 43 with the small tube 38 and ring 33 is similar. Between the two rings there is arranged the annular printed circuit 30 with the covers 34 and 35. The nose 31 engages the wall of the dispatch tube.

For purposes of mounting this contact arrangement, the front or rear groove in the dispatch tube may be employed. In this instance one sealing ring only is provided which is mounted in the other groove.

Figure 8:
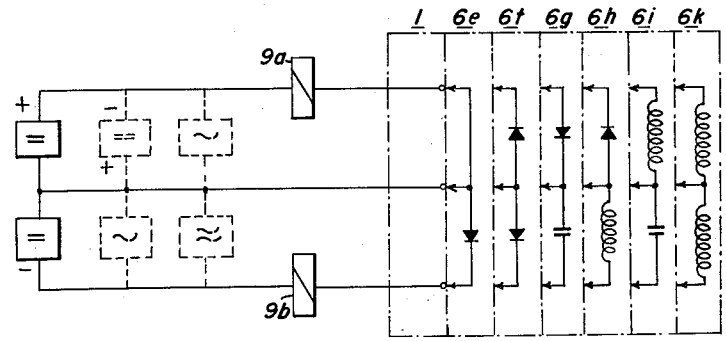

Due to the adjustability and in view of the at random selectable relative displacement of the contacts 42 and 43 with regard to each other, numerous control impulses may be initiated in a manner known per se. Additional variations will be possible when employing three or more spirals on the conveying pipes or when employing additional adjustable contact brushes on the dispatch tubes (FIG. 8).

Figure 4:
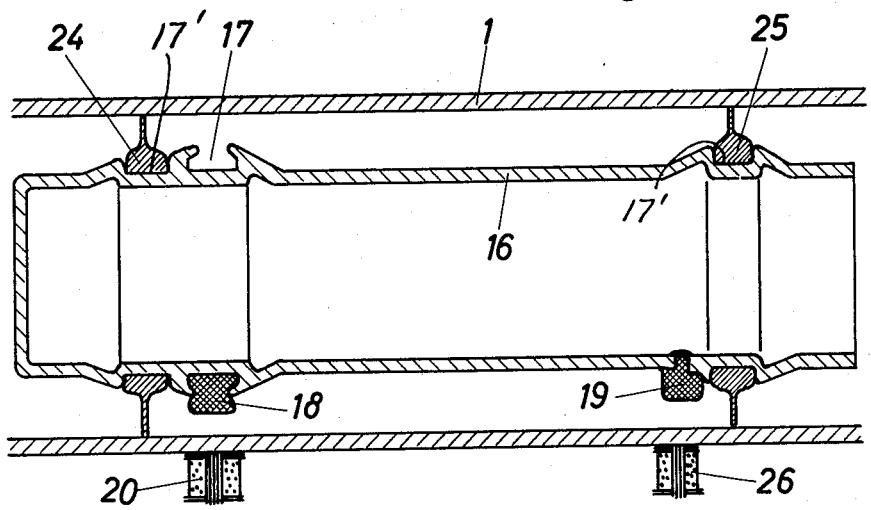
FIG. 4 is an axial section through a conveying pipe according to FIG. 1 with a modified dispatch tube therein.
Figure 9:
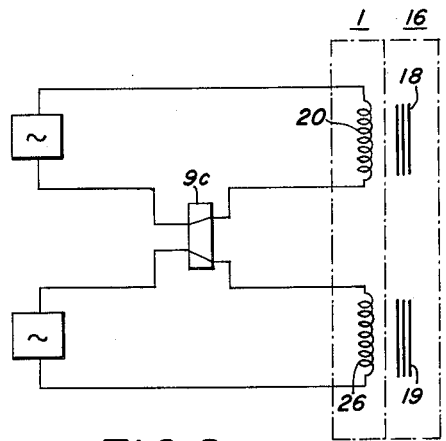

FIG. 4 illustrates an axial section through a conveying pipe 1 and a dispatch tube 16 which latter has arranged in a groove 17 a permanent magnet 18 which is displaceable on the circumference of tube 16, and also has arranged in a groove 17 a rubber sealing ring 24 and 25. FIG. 9 represents a circuit diagram of this arrangement. For purposes of an unequivocal indication, there is required at least one additional fixed permanent magnet 19 which in this instance is mounted at the other end of the dispatch tube. As indicators, the arrangement of FIG. 4 employs two cores with induction coils 20 and 26 which are mounted on the outside of the dispatch tube. These cores with induction coils may also be replaced by Hall generators. The spiral arrangement of the indicators necessary in conformity with the present invention may be obtained as shown for instance in FIG. 1 by adjoining a plurality of induction coils 21 or Hall generators 22.

Figure 10:
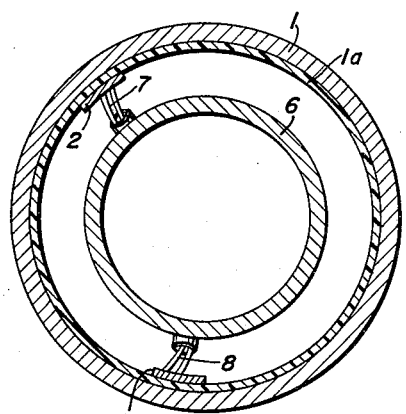
FIG. 10 is a radial section through a modified conveying pipe according to the invention with a dispatch tube therein, in which the conveying pipe is provided with a printed circuit.

FIG. 10 is a section similar to that of FIG. 2 but differs therefrom primarily in that on the inner side of conveying pipe 1 there is provided an insulating layer 1a on which the spirals 2 and 3 are provided in form of a printed circuit. The printed circuit is, of course, adapted to be engaged by the brushes 7 and 8.

By employing connections obtained by adhesives as they are well known in the art, also strips of metal foils may form the spirals 2 and 3 and be glued to the inside of the conveying pipe.

It is, of course, to be understood that the present invention is, by no means, limited to the particular constructions shown in the drawings but also comprises any modifications within the scope of the appended claims.

What I claim is:

1. In a control arrangement for dispatch tubes: dispatch tube conveying pipe means provided with contact means arranged on the inside thereof along at least two parallel spirals, and dispatch tube means for dispatch through said conveying pipe means, said dispatch tube means being provided with circumferentially spaced means for cooperation with said contact means.

2. A control arrangement according to claim 1, in which said contact means are in the form of electrical contact strips.

3. A control arrangement according to claim 1, in which said contact means are in the form of magnetic indicator means.

4. In a control arrangement for dispatch tubes: dispatch tube conveying pipe means with an inner wall of synthetic material, metallic contact strips extending along at least two parallel spirals and being embedded in said wall of synthetic material, and dispatch tube means for dispatch through said conveying pipe means, said dispatch tube means being provided with circumferentially spaced means for cooperation with said contact strips.

5. In a control arrangement for dispatch tubes: dispatch tube conveying pipe means, printed circuit means comprising at least two spiral-shaped contact means and insulating means therebetween, said printed circuit means being connected to the inner wall of said conveying pipe means with an insulating layer therebetween, and dispatch tube means for dispatch through said conveying pipe means, said dispatch tube means being provided with circumferentially spaced means for cooperation with said spiral-shaped contact means.

6. In a control arrangement for dispatch tubes: dispatch tube conveying pipe means having an inner wall of insulating material, spirally extending metallic contact strip means glued to said inner wall of said dispatch tube conveying pipe means, and dispatch tube means for dispatch through said conveying pipe means, said dispatch tube means being provided with circumferentially spaced means for cooperation with said contact strip means.

7. In a control arrangement for dispatch tubes: dispatch tube conveying pipe means having its inside provided with spirally arranged magnetic indicator means, and dispatch tube means for dispatch through said conveying pipe means, said dispatch tube means being provided with circumferentially spaced means for cooperation with said indicator means.

8. A control arrangement according to claim 7, in which said indicator means are composed of induction coils.

9. A control arrangement according to claim 7, in which said indicator means are composed of Hall generators.

10. In a control arrangement for dispatch tubes: dispatch tube conveying pipe means provided with contact means arranged along at least two parallel spirals, and dispatch tube means for dispatch through said conveying pipe means, said dispatch tube means being provided with circumferentially spaced electrical counter contact means for cooperation with said contact means of said conveying pipe means, said counter contact means being embedded in an elastic material.

11. A control arrangement according to claim 10, in which said counter contact means are contact brushes embedded in rubber.

12. In a control arrangement for dispatch tubes: dispatch tube conveying pipe means having the inside thereof provided with contact means arranged along at least two parallel spirals, and dispatch tube means for dispatch through said conveying pipe means, said dispatch tube means including elastic annular members mounted thereon and forming a pneumatic seal between said conveying pipe means and said dispatch tube means, and circumferentially spaced contact brushes mounted in said elastic annular members for cooperation with said contact means.

13. In a control arrangement for dispatch tubes: dispatch tube conveying pipe means provided with means arranged along at least two parallel spirals, and dispatch tube means for dispatch through said conveying pipe means, said dispatch tube means being provided with circumferentially spaced permanent magnets for cooperation with said means of said conveying pipe means, at least one of said permanent magnets being adjustable along the periphery of said dispatch tube means.

14. A control arrangement according to claim 13, in which the periphery of said dispatch tube means is provided with an annular groove, and in which at least one of said permanent magnets is displaceable in said annular groove.

15. In a control arrangement for dispatch tubes: dispatch tube conveying pipe means having its inner wall provided with contact means arranged along at least two parallel spirals, connecting lines connected to said spirals for conveying signal voltages of different characteristic thereto, dispatch tube means for dispatch through said conveying pipe means, said dispatch tube means being provided with circumferentially spaced contacts for cooperation with said contact means of said dispatch tube conveying pipe means, and electric control means interposed between and electrically connected to said contacts for discriminating between the shorter and longer connection between said contacts according to the angular position thereof.

16. A control arrangement according to claim 15, in which a diode forms said electric control means.

17. A control arrangement according to claim 15, in which an impedance forms said electric control means.

18. In a control arrangement for dispatch tubes: dispatch tube conveying pipe means provided with contact means arranged along at least two parallel spirals, dispatch tube means for dispatch through said conveying pipe means, tubular means at least partially surrounding said dispatch tube means and having openings circumferentially spaced from each other, and spring wires arranged within said tubular means and having one end thereof extend through said openings to form contact brushes for cooperation with said contact means of said dispatch tube conveying pipe means, the other ends of said wires being firmly held in said tubular means.

19. In a control arrangement for dispatch tubes: dispatch tube conveying pipe means provided with contact means arranged along at least two parallel spirals, dispatch tube means for dispatch through said conveying pipe means, contact strip means at least partially extending around and displaceably mounted on said dispatch tube means for circumferential adjustment thereof, and a plurality of contact brushes mounted on said contact strip means for cooperation with said contact means of said dispatch tube conveying pipe means.

20. In a control arrangement for dispatch tubes: dispatch tube conveying pipe means provided with contact means arranged along at least two parallel spirals, dispatch tube means for dispatch through said conveying pipe means, contact strip means superimposed upon each other and spaced from each other by an annular circuit printed on both sides thereof, and contact brushes mounted on said contact strip means for cooperation with said contact means of said dispatch tube conveying pipe means.

References Cited in the file of this patent

UNITED STATES PATENTS

| 2,723,810 | Manteuffel | Nov. 15, 1955 |
| 2,888,218 | Kuhn | May 26, 1959 |

FOREIGN PATENTS

| 387,930 | Great Britain | Feb. 16, 1933 |